(No Model.) 7 Sheets—Sheet 4.
D. H. RICE.
CASH CARRIER APPARATUS.
No. 318,294. Patented May 19, 1885.
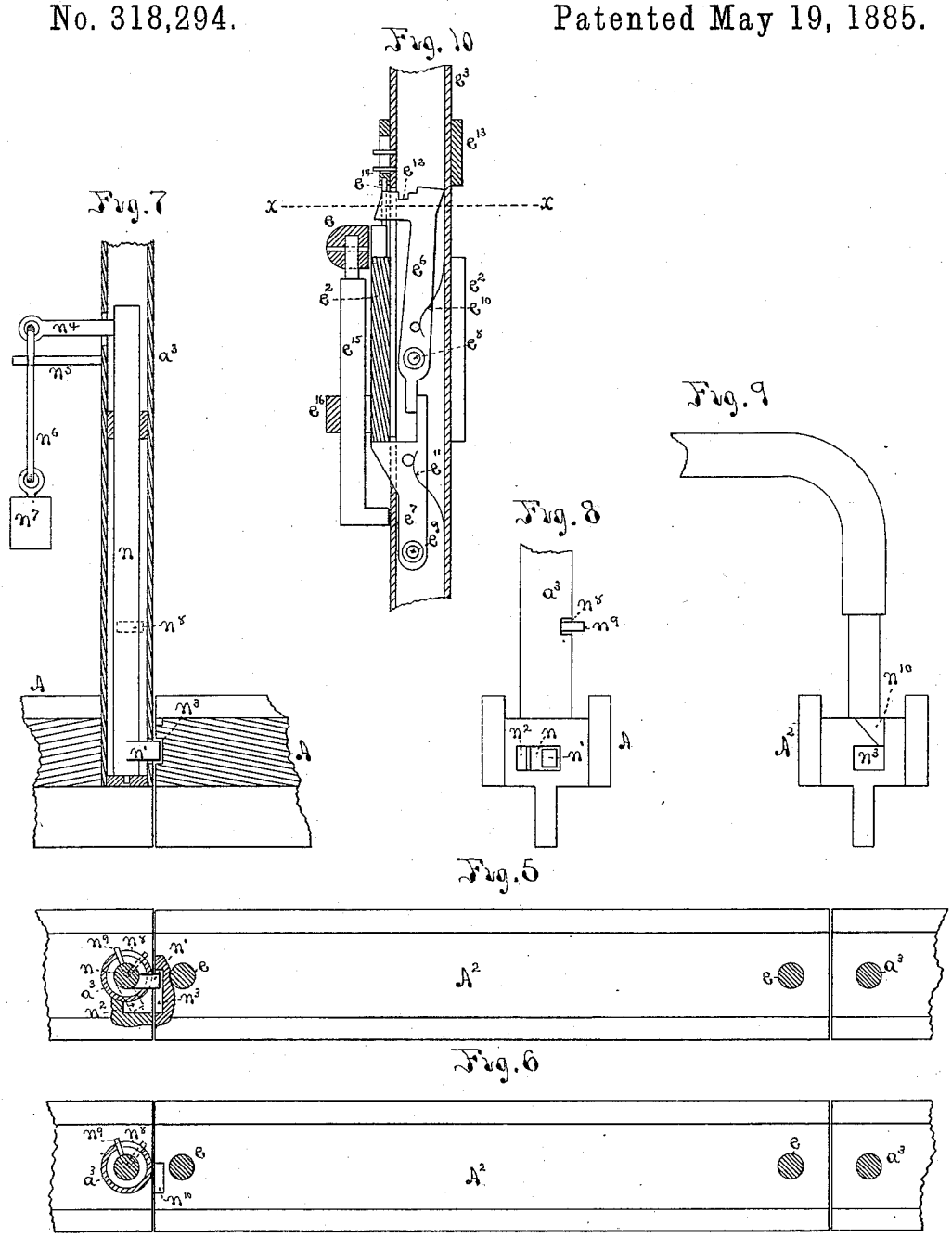
Witnesses
Wm. S. Brown
N. P. Ockington.
Inventor
David Hall Rice (No Model.)  7 Sheets—Sheet 5.

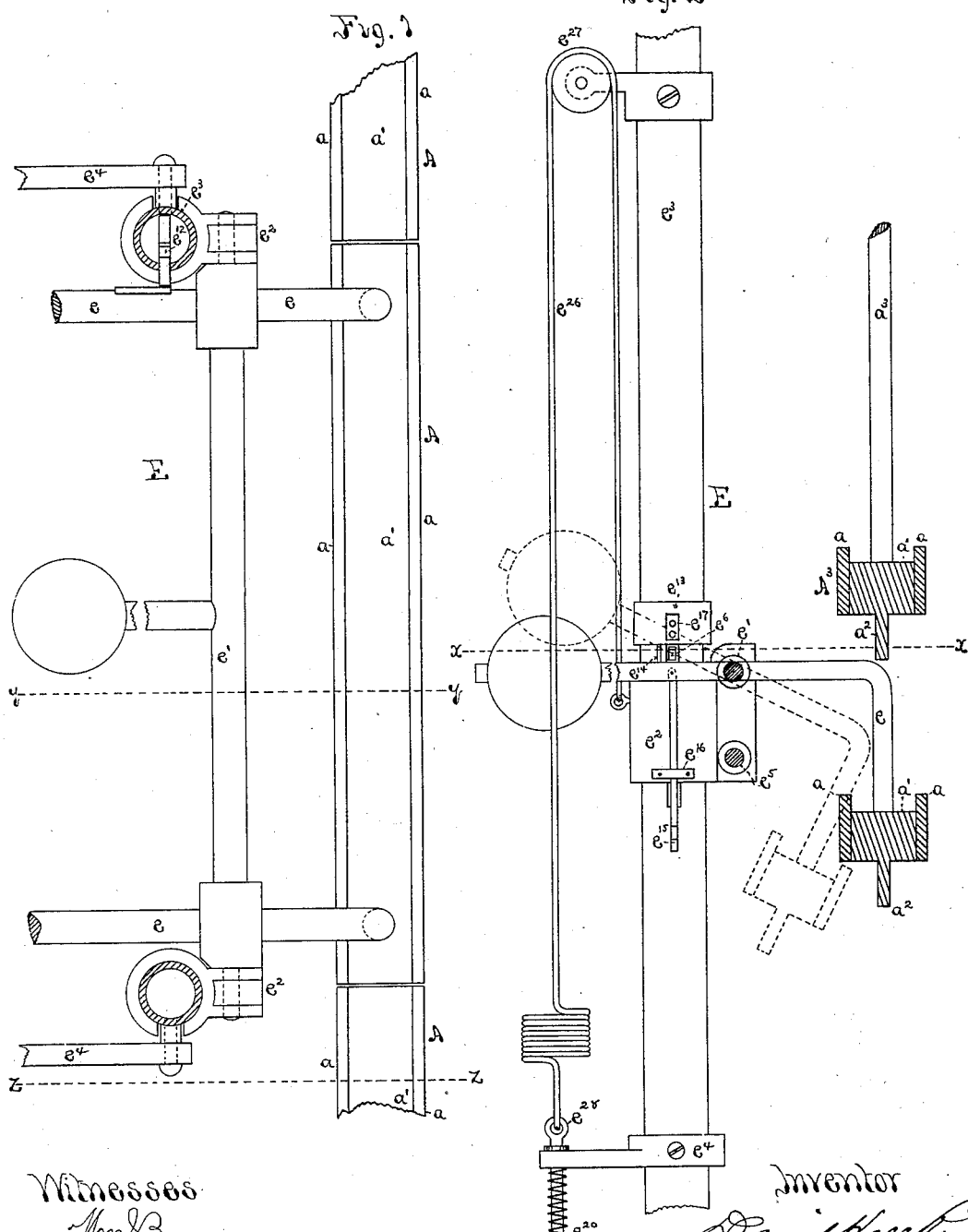

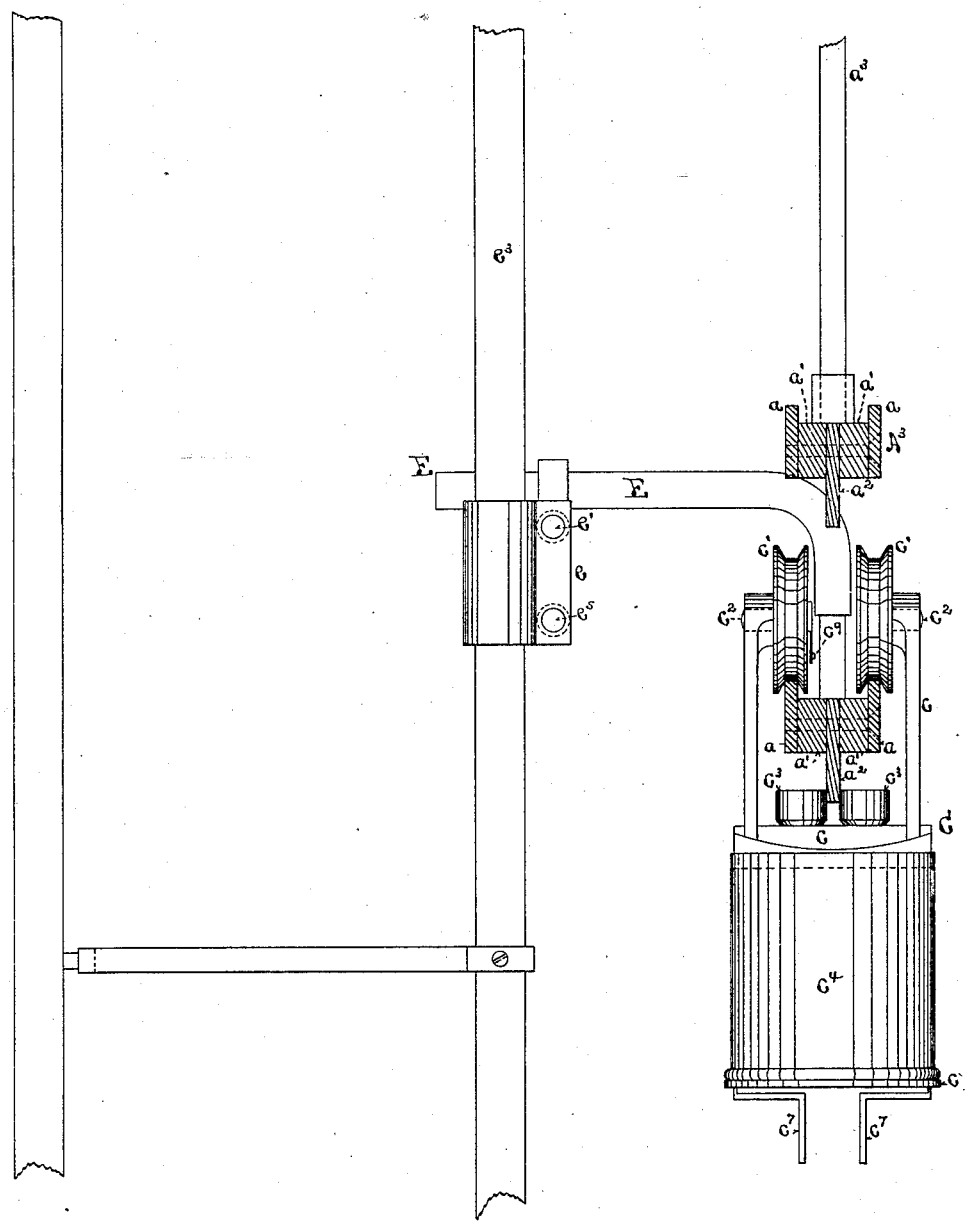

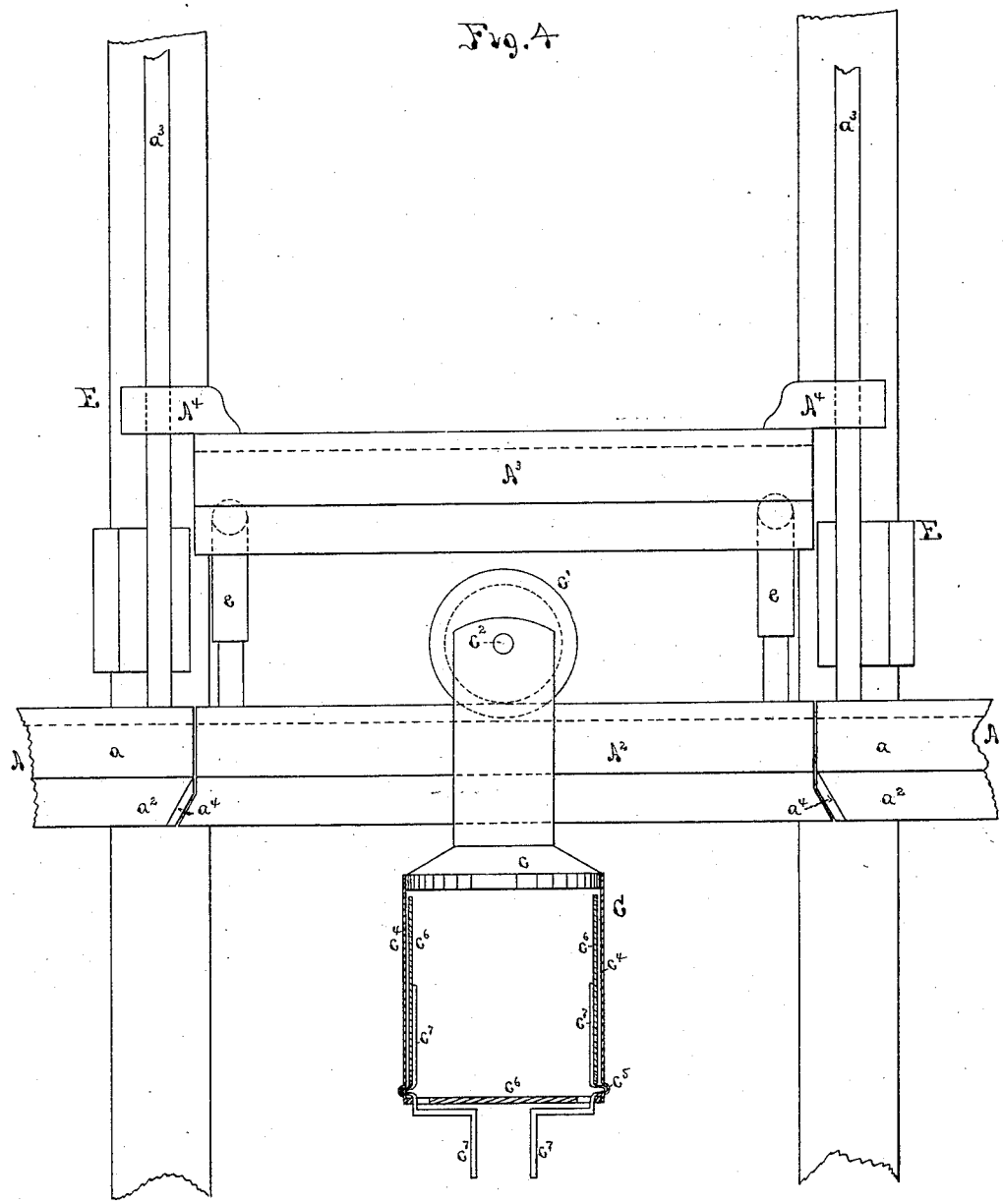

D. H. RICE.
CASH CARRIER APPARATUS.

No. 318,294.  Patented May 19, 1885.

Witnesses
Wm B. Brown
N. P. Ockington

Inventor
David Hall Rice (No Model.) 7 Sheets—Sheet 6.
D. H. RICE.
CASH CARRIER APPARATUS.
No. 318,294. Patented May 19, 1885.
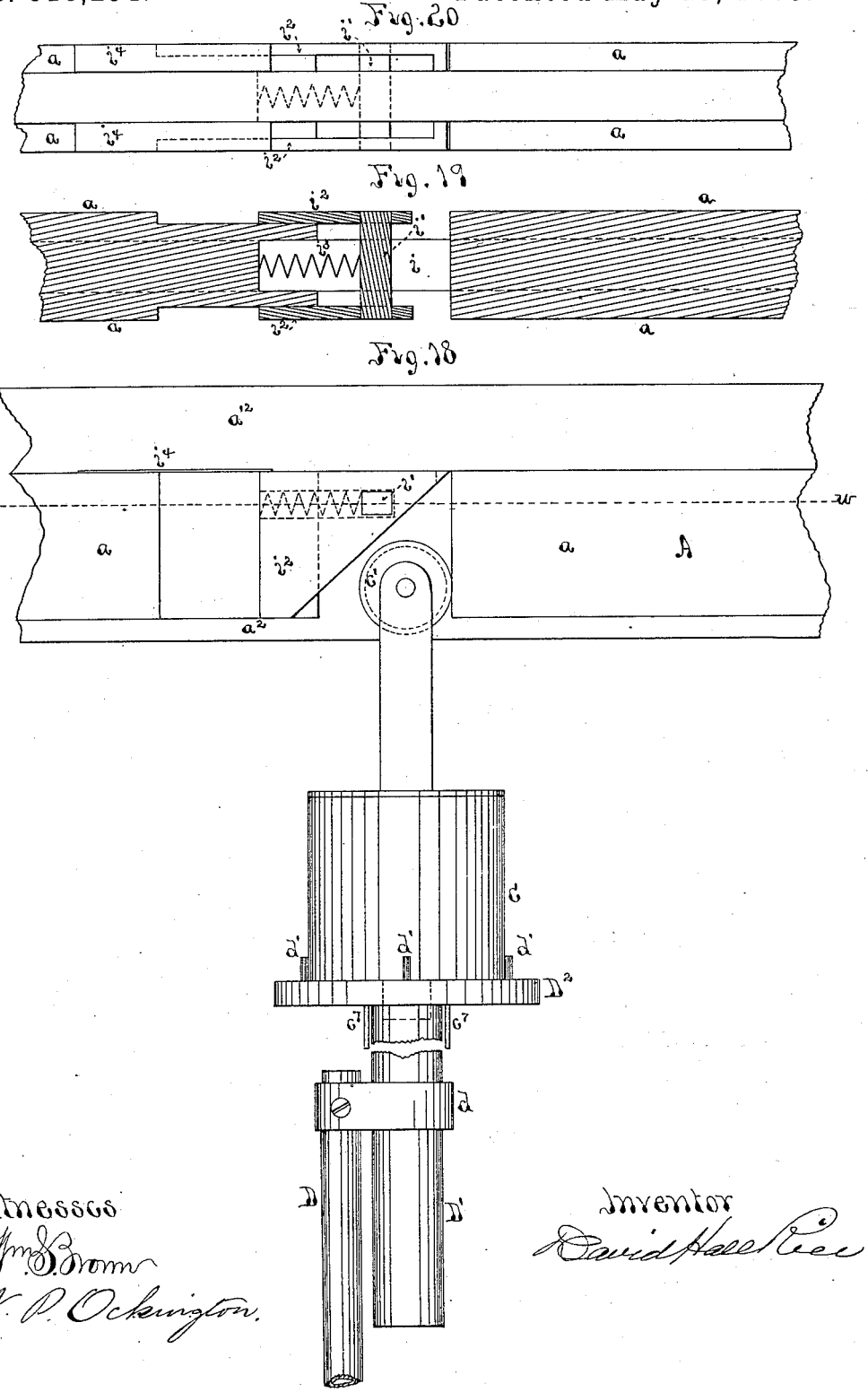
Witnesses
Wm S Brown
N. P. Ockington
Inventor
David Hall Rice (No Model.) 7 Sheets—Sheet 7.
D. H. RICE.
CASH CARRIER APPARATUS.
No. 318,294. Patented May 19, 1885.
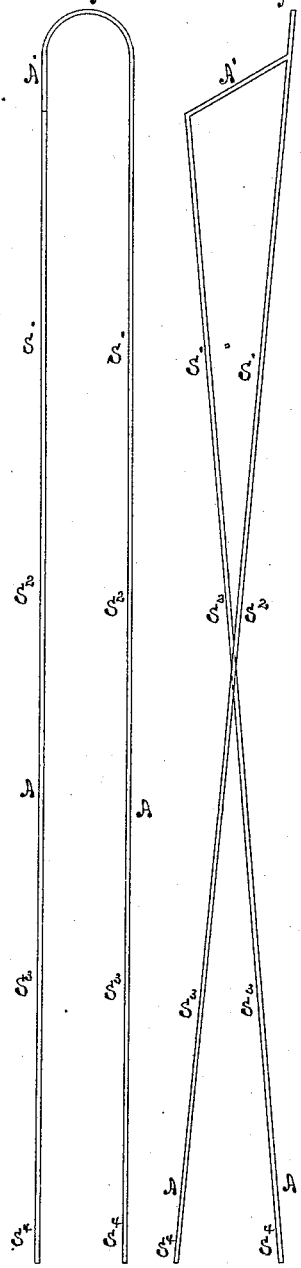
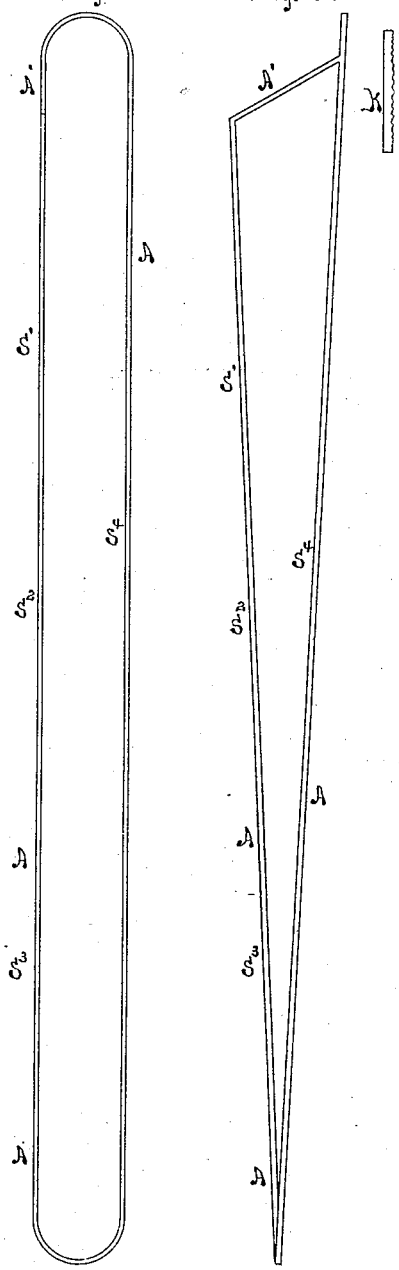
Witnesses
Inventor
David Hall Rice

UNITED STATES PATENT OFFICE.

DAVID HALL RICE, OF LOWELL, MASSACHUSETTS.

CASH-CARRIER APPARATUS.

SPECIFICATION forming part of Letters Patent No. 318,294, dated May 19, 1885.

Application filed February 18, 1885. (No model.)

*To all whom it may concern:*

Be it known that I, DAVID HALL RICE, of Lowell, in the county of Middlesex and State of Massachusetts, have invented a certain new and useful Improvement in Cash-Carrier Systems, of which the following is a specification.

My improvement relates to cash-carrier systems; and it consists of certain combinations of the parts of such carriers and of the tracks, elevators, and receiving devices therefor as shall constitute a more perfect and complete system for transporting cash or other small articles, all substantially as hereinafter described and claimed.

Figure 12:
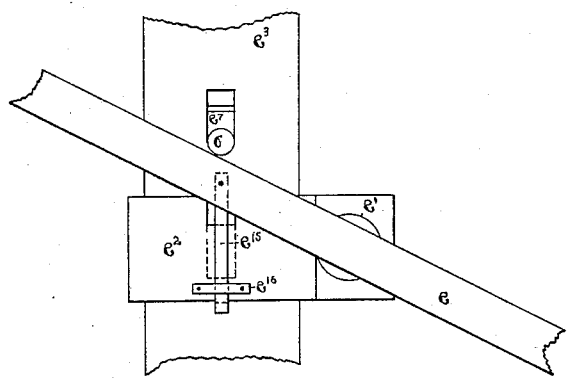
Figure 14:
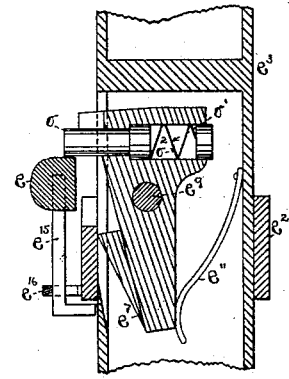
Figure 11:
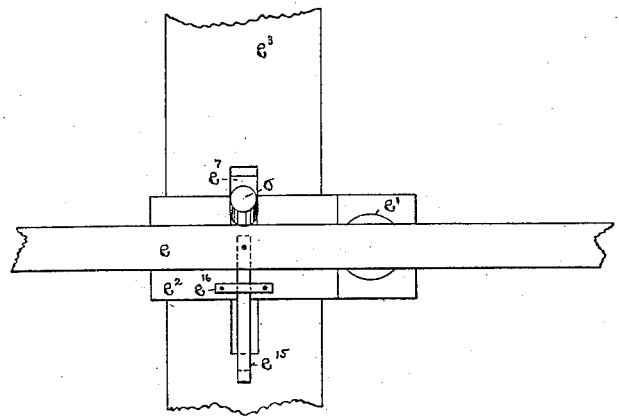
Figure 13:
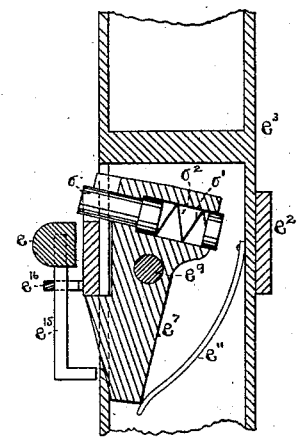
Figure 17:
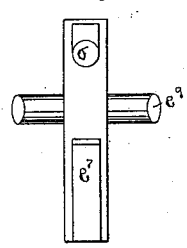
Figure 16:
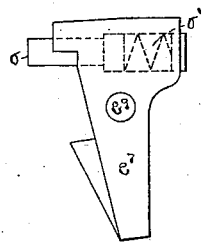
Figure 15:
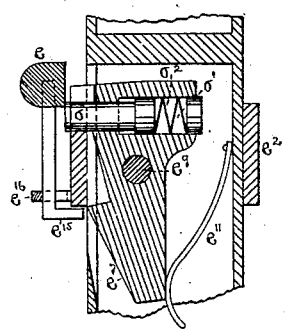

In the drawings, Figure 1 is a top plan view of a section of a track, and receiving, lowering, and elevating device for a cash-carrier, taken below the horizontal sectional line $x\ x$ of Fig. 2, and constructed according to my invention. Fig. 2 is a section and elevation of part of Fig. 1 through and above the line $y\ y$. Fig. 3 is a side view of Fig. 1 from the line $z\ z$, showing the carrier on the track and a cross-section of another form of construction of the latter. Fig. 4 is a face view of Fig. 3. Figs. 5 and 6 are top views of the rail in Fig. 1, partly in section, to show the construction of the rail-locking mechanism. Fig. 7 is a vertical longitudinal section of Fig. 6, showing the same. Fig. 8 is an end view of the fixed part of the rail carrying the locking-bolt, as shown in Figs. 5 and 6. Fig. 9 is an end view of the part of the rail that drops out, showing the mortise for locking the bolt into the same. Fig. 10 is a vertical sectional view of the vertical guide-rod of the receiving and raising and lowering mechanism and its locking latch, shown in side view in Fig. 2, and shows the details of construction of said locking-latch. Fig. 11 is a side view of said guide-rod provided with a similar latch, constructed in its details somewhat differently. Fig. 12 is the same as Fig. 11, with the latch mechanism in a different position. Fig. 13 is a vertical section of Fig. 11. Fig. 14 is a vertical section of Fig. 12. Fig. 15 is the same as Fig. 14, with the latch and elevating mechanism in a different position. Figs. 16 and 17 are side and edge views of the latch detached. Fig. 18 is a side view of an elevator, carrier, and track devices for placing the carrier on the track. Fig. 19 is a horizontal longitudinal section of the same on the line $w\ w$. Fig. 20 is a top plan view of the same. Fig. 21 is a top plan view of one form of track in connection with a cashier's desk for use with the carrier. Fig. 22 is a side elevation of Fig. 21. Fig. 23 is a top plan view of another form of track. Fig. 24 is a side elevation of Fig. 23.

A is a track composed of two side rails, $a\ a$, of wood, metal, or other similar material, and a central section, $a'$, of paper, or other similar fibrous substance to paper which has no resonant quality. The track A has a rib, $a^2$, along its lower side to aid in guiding and steadying the carrier.

In Fig. 3 is shown another mode of constructing this track, which consists in forming the rib $a^2$ of a piece of metal extending up into the paper $a'$, and securing the whole together by screws or rivets, as shown in dotted lines. The track A is suspended from the ceiling by rods $a^3\ a^3$, either solid or tubular.

C is the carrier adapted to run on the track A. It is provided with a frame, $c$, to the upwardly-projecting arms of which are attached two wheels, $c'\ c'$, turning on pivots $c^2\ c^2$. Two guide-rollers, $c^3\ c^3$, are also attached to the frame $c$—one on each side of the rib $a^2$—to steady the carrier on the track, these rollers turning on pivots fixed in the frame. To the lower face of frame $c$ is attached the cylinder $c^4$, open at the lower end. An annular groove, $c^5$, is made on the inside of the cylinder $c^4$, near its lower end, by spinning out the metal, as shown. Into this cylinder $c^4$ is placed the cup $c^6$, open at its upper end and formed of a cylindrical portion fitting the outside cylinder, and a horizontal bottom, which is circular, and projects outward under the lower end of cylinder $c^4$. Two bent springs, $c^7\ c^7$, are secured by rivets or solder at their extreme upper ends in the cup $c^6$, and have curved portions let through the wall of the cup by slots cut for the purpose into the groove $c^5$ in the outer cylinder. These springs serve thus to hold the cup in the cylinder. Below their bent portions which enter groove $c^5$ these springs extend downward through slots in the bottom of the cup, and by pressing together their lower ends, which project below the cup, they are drawn out of slot $c^5$, and permit the cup to be withdrawn from the cylinder $c^4$. For convenience, the springs $c^7$ may be bent, as shown, at their lower ends, to bring them into convenient position to be grasped by the hand. It will be observed that no matter which way the bent springs $c^7$ happen to be, in placing the cup $c^6$ into cylinder $c^4$ they will enter the groove $c^5$ with equal facility, and the bent parts of the springs which enter the groove are so formed that by merely pressing upward on the bottom of the cup they will snap into the groove $c^5$, thus affording a quick and simple mode of securing the cup in place. The cup being deep, none of the change placed in it can be readily lost or dropped out in removing it from the carrier or replacing it therein. The track A, Figs. 21, 22, 23, and 24, is in all cases a single track, and at the cashier's desk K is placed an inclined part of it, A', which leads from its uppermost to its lowermost point. One part of the track inclines from its uppermost point toward the several stations, S' S², &c., on the line of the track, while the other inclines from said stations to the station or desk K. With the form shown in Figs. 21 and 22 the carriers are received on one part of the track inclining to the station and sent to desk K by placing them upon the oppositely-inclined part. In the form shown in Figs. 23 and 24, the track being endless, the carriers are placed upon the part of it inclining in the same direction. When a carrier is received at desk K, it is not taken from the track, but the cup $c^6$ is removed and replaced while it is upon the track, and the carrier is pushed up the incline A' and started back to its station.

In order that the carrier may be delivered at the station on the line of rail A to which it belongs, and not be delivered at any other station, I employ the following devices: At each station a section, A², is cut out of the rail A, as shown in Figs. 4, 5, and 6. This section is formed the same as the rest of the rail, and where cut from the rib $a^2$ it is expanded outward, so as to permit it to be introduced in place to only a certain height before the beveled parts stop its further rise. These beveled stops are provided with rubber buffers or cushions $a^4$ $a^4$, to prevent any shocks in their operation. The section A², instead of being held by the rods A³, is sustained by two arms, $e$ $e$, of the elevator-drop mechanism E. These arms pass through the enlarged parts of the shaft $e'$, in which they are firmly fixed. The shaft $e'$ is provided with bearings on which it turns in the sleeves $e^2$ $e^2$, and the latter in turn slide up and down on the vertical hollow rods $e^3$ $e^3$. The sleeves $e^2$ $e^2$ are slotted on one side vertically to allow braces $e^4$ $e^4$, to be attached to the rods at intervals in the path of the sleeves, as shown in Figs. 1 and 4. The sleeves $e^2$ are held together by a rod, $e^5$, firmly fixed at the ends in them below the shaft $e'$. They are raised and lowered by a cord, $e^6$, attached to this rod at one end and running over the pulley $e^7$ and attached to the bolt $e^8$ at the other end. This rod slides through the brace $e^4$ and has a spiral spring, $e^9$, around it bearing at one end against a collar, $e^{10}$, attached to the bolt and at the other end against the brace. When the sleeves $e^2$ $e^2$ and the rail A² and other supported parts slide down on the rods $e^3$ $e^3$ and reach the bottom of their descent, the cord $e^6$, being entirely run out, brings a strain upon the bolt $e^8$, and thus by the elastic yielding of the bolt checks the descent of the elevator-drop mechanism. The latter is held from descending by a latch placed in one of the tubular rods $e^3$, and consequently the first movement of the rail A², when it is unlocked from the rail A, is a rotary one, turning on the shaft $e'$ to the position shown in dotted lines in Fig. 2. This movement unlocks the latch which holds the sleeves of the elevator-drop mechanism in place on the rods $e^3$, and the whole descends to the person waiting to receive it below. This initial rotary movement of the rail A² about its axis $e'$ also serves to bind the wheels of the carrier upon the rail, and thus dispenses with any brake or stop mechanism for stopping the carrier when about to descend and descending.

It is obvious that instead of two rods $e^3$ and sleeves $e^2$ and arms $e$ only one of each may be used to support and operate the rail-section A² in the manner substantially as described.

The rail A² is locked to the rail A by a latch mechanism constructed to be unlocked by the carrier at the instant that the latter runs upon the rail A², when the weight of the rail and carrier combined causes its descent, as before described. This latch mechanism is constructed as follows: The rod $a^3$, which sustains the end of the rail A from which the carrier runs onto rail A², is made tubular, (see Figs. 5, 6, 7, 8, and 9,) and has mounted inside of it the shaft $n$, revolving on a pivot at its lower end in a bushing in the rod $a^3$. On one side of this rod is attached a latch, $n'$, projecting horizontally through a slot in the side of the tubular rod into a mortise, $n^2$, in the end of rail A. This latch is so arranged that when it is turned with shaft $n$ in one direction it projects beyond the end of rail A, as shown in Figs. 5 and 7, and into a mortise, $n^3$, cut in the end of rail A², and when it is turned with the rod in the other direction it is withdrawn entirely into the mortise $n^2$ in rail A. The shaft $n$ has attached to its upper end an arm, $n^4$, that projects horizontally through an opening in the side of the tubular rod. Just beneath this opening a long pin, $n^5$, is fixed in the side of tubular rod $a^3$. A cord, $n^6$, is attached to the arm $n^4$, and, extending across pin $n^5$, sustains the weight $n^7$ in such a position that the weight holds the shaft $n$ and latch $n'$ locked into rail A², as shown in Fig. 7. Just opposite where the carrier passes along in the tubular rod $a^3$ is cut a slot, $n^8$, through which a pin, $n^9$, fixed in shaft $n$, projects in the position shown in Figs. 5 and 6 when the rail A² is locked in place.

On the end of one of the axles $c^2$ of the carrier-wheels $c'$, Fig. 3, is attached a pin, $c^9$, which is placed at the proper level to engage with the pin $n^9$ of the rail-locking device, and thereby revolve the shaft $n$ and unlock the rail $A^2$. This operation is performed while the weight of the carrier is still upon rail A, and the latch $n'$ is not bound in the mortise $n^3$ by it, which renders the unlocking of it comparatively easy.

All the rail-locking devices at the different stations are alike in construction, except in the height of the slot $n^8$ and pin $n^9$ from the track, wherein they all differ sufficiently to prevent any one carrier from unlocking the drop-elevator rail $A^2$ of any other station than the one where it belongs, and as each carrier has its pin $c^9$ placed at just the proper height to unlock its own elevator it follows that any carrier may be sent over the track A and any number of drop-elevator tracks besides its own to the central station, K, without difficulty, which is important, because in many locations it effects a saving in the total number of tracks used to employ the same track both to send carriers over to and return them from the central station, K. Of course it is understood that the pin $c^9$ on the carrier is so formed as to hold the rail $A^2$ unlocked until the carrier has entered upon it and has begun to descend.

In order to enable the rail-latch mechanism to lock itself when the track $A^2$ is returned to its place by the action of the drop-elevator mechanism, an inclined slot, $n^{10}$, is cut in the top of the rail $A^2$, as shown, so that as this rail is brought up from below into place in rail A this slot will be struck by the end of latch $n'$ and turn the latter to an unlocked position to permit the end of rail $A^2$ to pass by it. When the end of rail $A^2$ has risen sufficiently to bring the mortise $n^3$ opposite the latch, the latter, by the action of the weight $n^7$, falls into the mortise and locks the rail. A cord is attached to the end of arm $n^4$ to unlock the latch mechanism of rail $A^2$ by pulling on the same when desired, without the operation of the carrier therewith, thus controlling the descent of the drop-elevator mechanism at times when a carrier is not received.

It has been mentioned that the sleeves $e^2$ of the drop-elevator mechanism are held up in place by a latch which is unlocked by the dropping of the rail $A^2$ and arms $e$ $e$ to the position shown in dotted lines in Fig. 2. This latch mechanism also operates automatically to replace the arms in a horizontal position, and place the rail $A^2$ in line with rail A by the hoisting of the sleeves. It is shown in Figs. 2 and 10. A double latch or stop, $e^6$ $e^7$, is pivoted in the tube $e^3$ on pivots $e^8$ $e^9$. The nose end of each member of the latch projects through a vertical slot in the face of the tube, but owing to the part of each member projecting past the other, as shown, when the nose of $e^7$ is projected outward the nose of $e^6$ can only project out so far as to come over the sleeve $e^2$. If, however, the latch $e^7$ is pressed back into the tube $e^3$, $e^6$ will be thrown forward by its spring $e^{10}$, so that its nose end will project over the path of the swinging arm $e$. The spring $e^{11}$ of the latch $e^7$ is made strong enough to throw out the nose of its latch and draw back latch $e^6$, when both are free to operate. A notch, $e^{12}$, is made in the top side of the nose of latch $e^6$, and a sliding sleeve, $e^{13}$, is placed around the tube $e^3$, which is free to drop downward by gravity and have its lower edge fall into this notch as the latter passes under it. This sleeve will thus lock the nose of the latch $e^6$ in its position when projecting over arm $e$. A pin, $e^{14}$, fixed in the sleeve $e^{13}$, projects downward just below the nose of $e^6$ on one side of it and in line with the path of sleeve $e^2$, and when the latter comes against the lower end of this pin it will lift the sleeve out of the notch $e^{12}$, thus unlocking the latch $e^6$. A pendent hook, $e^{15}$, is pivoted in the arm $e$ so as to swing freely, and it passes under a strap, $e^{16}$, on sleeve $e^2$, the latter serving merely to guide its hook end in the proper path as it is drawn upward by the arm $e$. The hook end of this hook travels along close to the face of tube $e^3$ and over the beveled side of the nose of latch $e^7$. The locking-sleeve $e^{13}$ is prevented from turning round by a slot, $e^{17}$, and two small pins fixed in the tube $e^3$ and fitting loosely in the slot; but this slot and pins may be omitted, if desired.

The operation of the parts is as follows: The drop-elevator mechanism being up and the rail $A^2$ and sleeves locked by the latch $e^7$, as shown in Figs. 1, 2, and 10, the rail is unlocked, as before described, and descends to the position shown in dotted lines in Fig. 2, turning on the shaft $e'$. As the arms $e$ $e$ rise on the left-hand side of their shaft $e'$, the one having the pendent hook $e^{15}$ attached to it draws the hook upward, bringing its point over the latch $e^7$, and pressing the latter into the tube $e^3$ until the hook brings up against the lower end of sleeve $e^2$, and thus stops the arms $e$ $e$ rising farther. In this position latch $e^6$ will be kept from springing out by its nose pressing against the vertical face of arm $e$, and the sleeves $e^2$ $e^2$, being unlocked, will begin to descend, carrying the whole elevator mechanism downward. This will carry arm $e$ down from over the nose of latch $e^6$, and latch $e^7$, being held back in the tube $e^3$ by its nose being in contact with the inside face of sleeve $e^2$, as the latter slides down over it and latch $e^6$, will spring forward, bringing notch $e^{12}$ under locking-sleeve $e^{13}$, when the latter will drop into the notch and lock the latch $e^6$ in its extreme outward position and the latch $e^7$ back in the tube $e^3$. The nose of the latch $e^6$ is thus left projecting over the path of the arm $e$. When the carrier has been removed from the track $A^2$, or its contents removed, and it is desired to replace the track in the track A by hoisting the elevator mechanism by the cord $e^{26}$, as it rises the arm $e$ will first come into contact with the nose of latch $e^6$, and the sleeves $e^2$ and shaft $e'$, continuing to rise, will bring the arms $e$ $e$ to a horizontal position and lock the rail A² into rail A. Just as this is accomplished the sleeve $e^2$ will come against pin $e^{14}$ and lift locking-sleeve $e^{13}$ out of notch $e^{12}$ in latch $e^6$, and the upper end of the sleeve will strike the nose of the latch and be stopped; but at this moment the lower end of the sleeve will have passed latch $e^7$, which will spring outward under the sleeve, as shown in Fig. 10, and withdraw the latch $e^6$ to the position there shown, ready for the next descent of the drop-elevator.

In order to prevent any other carrier from running off the track at that place while rail A² is dropped, as described, I provide another section of rail, A³, which is fitted to slide up and down on the rods $a^3 a^3$, sustaining the ends of rail A, Fig. 4, by two clips, A⁴ A⁴, attached to its ends, fitting loosely on the rods. This section of rail A³ rests upon the arms $e e$ when rail-section A² is in place in rail A; but when rail A² is unlocked and drops down rail-section A³ slides down into its place and leaves the track continuous. On rail-section A² being again lifted to place, the arms $e e$, coming under section A³, lift it out and slide it up the rods $a^3 a^3$.

The carrier may be replaced upon the track by the drop-elevator mechanism; but I prefer to employ the elevator mechanism shown in Figs. 18, 19, and 20.

D is a rod carrying a sleeve, $d$, in which slides up and down another rod, D′, carrying on its top end a platform, D², made with a series of guide-pins, $d' d'$, which will receive the lower end of the carrier within them, and holes cut through it to receive the ends of the springs $c^7 c^7$. The side rail-pieces, $a a$, are cut entirely away directly over the elevator for a distance equal to the breadth of the carrier-wheel $c'$, and are cut away for about half their thickness from their outer surfaces. A central web, $a^{12}$, of the track is also prolonged upward at this point between the side pieces, $a a$. A slot, $i$, is cut transversely and horizontally through the middle part of the track, and in this slot a cross-beam, $i'$, is fitted, so as to slide to and fro in it lengthwise of the track. Attached to the ends of this cross-beam are two movable sections, $i^2 i^2$, of the side rail-pieces, $a a$, fitted to slide longitudinally in the cut-away part of these side rail-pieces, as shown. These movable sections $i^2 i^2$ are beveled off or cut away on their lower edges, in order that as the wheels of the carrier C are raised up by the elevator, so as to come on each side of the central part of the track, the edges of the wheels will strike against these opposite beveled edges, as shown, and move the sections along sufficiently to allow the wheels to pass by them and above the track-pieces $a a$. A spiral spring, $i^3$, in the slot $i$ bears against the cross-beam $i'$ and presses the beam and sections $i^2 i^2$ back into place again as soon as the wheels have passed by them, as described, and the carrier then rolls down the inclined track in either direction desired. Over the cut-away part of the rail-pieces $a a$ into which the movable sections $i^2 i^2$ slide back to admit the carrier upon the track, as described, are placed two flat thin pieces of steel, $i^4 i^4$, which overlap the sections slightly and complete the surface of the track its entire breadth at this point. The sections $i^2 i^2$ therefore slide back under the pieces $i^4 i^4$, which are attached to the upper edges of the rail-pieces $a a$. By this construction this part of the track, while adapted to receive the carrier-wheels, as described, is made practically continuous, so that a carrier from another station can pass over it without difficulty.

In Figs. 11 to 17 are shown a modification of the latch mechanism shown in Figs. 10 and 2. The latch $e^7$ is pivoted, as before, and held forward by the spring $e^{11}$, but its pivot is placed above the nose of the latch which supports the sleeve $e^2$, instead of below it. For the second member of the latch I use a bolt, $o$, sliding in a chamber, $o'$, in the upper part of latch $e^7$. This chamber is made larger for the greater part of its length from the rear edge of the latch $e^7$, and a head or enlargement on bolt $o$ fits this larger part of the chamber and prevents the bolt being thrown forward beyond a certain distance. A spiral spring, $o^2$, is confined in chamber $o'$, by a plug fixed in the back end of the chamber, so as to press against bolt $o$ and hold it forward, and also allow it to be pressed back within the chamber. The hook $e^{15}$ and its guide-strap $e^{16}$ are attached to arm $e$ and sleeve $e^2$, as before. When the rail is unlocked by the carrier, the arm $e$ and other parts being in the positions shown in Figs. 11 and 13, the arm turns upon its axis $e^7$, and drawing up hook $e^{15}$ rises to the position shown in Fig. 15, unlocking the drop-elevator and allowing it to descend the tubular guide-rods $e^3 e^3$. As the drop-elevator mechanism again ascends the sleeve $e^2$ first comes in contact with the nose of the latch $e^7$, and pressing it back throws forward the latch-bolt $o$, which, projecting over arm $e$, as shown in Figs. 12 and 14, brings it to the position shown in Fig. 11, locking the rail-section A² in place, and at the same time, upon sleeve $e^2$ striking bolt $o$, causing the nose of the latch $e^7$ to spring forward under the sleeve, thus holding it in place until the rail mechanism is again unlocked.

It will be noticed that bolt $o$ performs the same functions as latch $e^6$ in bringing the rail-section by arm $e$ into place, as well as in checking the ascent of sleeve $e^2$, while the latch $e^7$ operates as before in holding the sleeve up in place.

Although I prefer the form shown in Fig. 10, yet the above modification of it will perform efficient service.

My several improvements above described constitute a complete system of tracks with receiving and delivering devices for the several stations, it being intended that the carrier shall be removed from rail A² and placed on the elevator (shown in Figs. 18, 19, and 20) to replace it upon the track.

What I claim as new and of my invention is—

1. In a cash-carrier apparatus, the rail A, in combination with the track-section $A^2$, forming part thereof at a station intermediate between two other stations on said rail, and the supporting arm or arms $e$, attached to said section $A^2$ at one end, and to a rising and falling support independent from said track near the other, and provided with suitable mechanism for permitting said track-section and arm or arms to drop downward out of the path of a carrier traversing said track past said intermediate station, substantially as described.

2. In a cash-carrier apparatus, the rail A, in combination with the track-section $A^2$, forming part thereof at a station intermediate between two other stations on said rail, and provided with suitable attached mechanism for allowing said track-section to drop out of said rail to a position beneath the path of a carrier thereover, and with a latch mechanism locking said track-section to said rail, and adapted to be unlocked by a predetermined carrier passing thereover, substantially as described.

3. In a cash-carrier apparatus, the rail A, in combination with the track-section $A^2$, forming part thereof, and provided with suitable attached mechanism, substantially as described, for allowing said track-section to drop out of said rail, and with a latch mechanism, substantially as described, locking it to said rail, and adapted to be unlocked by a predetermined carrier passing over said track before the latter enters upon said track-section, and to be held in an unlocked position while said carrier passes upon said track-section and descends therewith, substantially as described.

4. In combination with the rail A, the track-section $A^2$ and its attached pivoted arm or arms $e$, swinging down with the track out of the path of a carrier passing over said track, substantially as described.

5. In combination with rail A and rods $a^3$ $a^3$, the track-section $A^2$ and attached pivoted arm or arms $e$, and the track-section $A^3$, sliding up and down on said rods, substantially as described.

6. In combination with rail A and rods $a^3$ $a^3$, the track-section $A^2$ and attached pivoted arm or arms $e$, and locking mechanism for locking said track-section in said rail, substantially as described.

7. In combination with the rail A, the removable track-section $A^2$, provided with elastic buffer-pieces $a^4$ $a^4$, and suitable mechanism for dropping said section out of and replacing it in said rail, substantially as described.

8. The combination of the rail A, track-section $A^2$, arm or arms $e$, pivot $e'$, and hook or stop $e^{15}$ for arresting the rotary movement of said arm and pivot, substantially as described.

9. In combination with the rail A, the track-section $A^2$, arm or arms $e$, rod or rods $e^3$, and sliding sleeve or sleeves $e^2$, forming a drop-elevator, substantially as described.

10. The combination of the rail A, track-section $A^2$, arm or arms $e$, pivot $e'$, rod or rods $e^3$, and sliding sleeve or sleeves $e^2$, substantially as described.

11. The combination of the rail A, track-section $A^2$, arm or arms $e$, pivot $e'$, sliding sleeve $e^2$, hook or stop $e^{15}$, and rod or rods $e^3$, substantially as described.

12. The combination of the rail A, track-section $A^2$, suspended by suitable pivot or pivots placed one side of and having their axes parallel to it, and adapted to rotate thereon away from the path of the carrier-wheels passing over track A, suitable latch mechanism locking said track-section to said rail, and a carrier adapted to strike against and unlock said latch mechanism and pass upon said track-section and descend therewith, substantially as described.

13. The combination of the fixed rail A, movable track-section rail $A^2$, and rotary latch $n'$, pivoted in one of said rails and locking into the other, substantially as described.

14. The combination of the tubular rail-support $a^3$, rail A, and track-section $A^2$, with the rotary latch mechanism locking them together and having its pivot-shaft prolonged upward into said tube $a^3$, and provided with suitable mechanism or attachment to rotate the same through a slot in said tube, substantially as described.

15. In combination with rail A and track-section rail $A^2$, the rotary latch pivoted in one of them, and a beveled slot, $n^{10}$, and mortise $n^3$ in the other, adjusted to automatically lock said latch and secure said rails together as they are brought past each other, substantially as described.

16. The compound rail A, formed of alternate sections of metal and paper or other similar fibrous material, substantially as described.

17. The rail A, formed of two outside tracks, $a$ $a$, for the passage of the wheels, and a longitudinal projecting web or guide-piece for the carrier, substantially as described.

18. In combination with the sleeve $e^2$ and pivoted arm $e$, the rod $e^3$, provided with a double latch or stop mechanism, one member of which is adapted to engage with said sleeve and lock it in position upon rod $e$, substantially as described.

19. In combination with the rod $e^3$ and sleeve $e^2$ sliding thereon, the pivoted arm $e$, and the stop $e^6$, adapted to engage with said arm and raise it to a horizontal position as the sleeve rises, substantially as described.

20. The combination of the fixed rail A, the movable track-section rail $A^2$, a suitable latch mechanism for locking the same together, and provided with an unlocking attachment adapted to be struck by the carrier and unlocked by it before the latter enters upon said track-section, and to be held in said unlocked position while the carrier descends through the space in said rail A occupied by said track-section, substantially as described.

21. The combination of rod $e^3$, vertical sliding sleeve $e^2$, pivoted arm $e$, and latch $e^7$, placed in said rod and adapted to lock said sleeve in a fixed position thereon, substantially as described.

22. The carrier C, provided with wheels for traversing the track, an outer casing, $c^4$, an inner box or casing, $c^6$, and one or more springs, $c^7$, adapted to automatically lock said outer and inner casings together and to be unlocked by pressure thereon applied to their parts projecting outside of said inner box, substantially as described.

23. The track A, provided with two wheel-tracks, $a\ a$, for a double wheel-carrier, having a portion of their opposite parts cut away, and the movable sections $i\ i$, fitted therein to form a continuous track, said sections $i\ i$ being adapted to be simultaneously moved aside to permit the carrier-wheels to ascend past them and to then return to position and complete the tracks $a\ a$, substantially as described.

24. In combination with the rail having two wheel-tracks, $a\ a$, cut away in parts opposite to each other, the movable sections $i\ i$, adapted to be pushed to one side by the carrier-wheels rising under them, and allow the latter to ascend above the tracks $a\ a$, and to then be returned to place under said wheels and complete said track, substantially as described.

25. The combination of the track formed with two wheel-paths, $a\ a$, cut away in opposite parts, two movable sections, $i\ i$, placed therein and adapted to be moved to one side simultaneously by the pressure of the carrier-wheels to allow the latter to pass upon said track, and an elevator adapted to bring said wheels beneath and press them upward against said sections, substantially as described.

26. The combination, in the carrier-track, of the wheel-rails $a\ a$, the movable sections $i\ i$, beveled on their lower edges, and the spring $i^3$, substantially as described.

27. The combination, in the carrier-track, of the wheel-rails $a\ a$, the movable sections $i\ i$, beveled on their lower edges, the spring $i^3$, and the strips $i^4\ i^4$, substantially as described.

28. In combination with the cashier's desk, forming a station thereon, the track A, having one portion inclined from said station to other stations, and another portion inclined from said other stations to said station K, and the short incline A' at said station K connecting the other inclined portions, substantially as described.

29. In combination with the elevator E, the pulley $e^{27}$ and cord $e^{26}$, attached at one end to said elevator and at the other to an elastic or yielding support, substantially as described.

DAVID HALL RICE.

Witnesses:
WILLIAM P. BLAKE,
N. P. OCKINGTON.